Patented Nov. 4, 1924.

1,514,508

UNITED STATES PATENT OFFICE.

CARLETON ELLIS, OF MONTCLAIR, NEW JERSEY.

AMORPHOUS PRODUCT AND PROCESS OF MAKING SAME.

No Drawing. Application filed May 9, 1922. Serial No. 559,610.

*To all whom it may concern:*

Be it known that I, CARLETON ELLIS, a citizen of the United States, and a resident of Montclair, in the county of Essex and State of New Jersey, have invented certain new and useful Improvements in Amorphous Products and Processes of Making Same, of which the following is a specification.

The object of the present invention is to produce an amorphous or colloidal solid material not affected by cold or hot water, substantially infusible or having a very high softening point and being transparent, translucent or opaque as desired; which material at one stage of treatment may be molded or shaped into useful articles such as buttons, combs, brush handles and other toilet articles, umbrella handles, beads, pipe stems and bowls, cigarette and cigar holders, ink wells, tortoise shell imitations and the like and various other products which are required to be hard and strong, not readily inflammable and not turned white, stained or spotted on contact with water, etc.

The amorphous product may be made from a ketone such as acetone and an aldehyde, particularly formaldehyde, by reacting in the presence of an alkali to produce successively, the following:

A. A water soluble syrupy substance.

B. An amorphous fusible substance practically insoluble in water but soluble in alcohol, also soluble in strong acid to some extent as for example concentrated hydrochloric acid or syrupy phosphoric acid.

C. A product insoluble in alcohol although sometimes partially soluble in a mixture of alcohol and benzol, and which is more or less fusible.

D. A product insoluble in all common solvents but still softening under heat although not actually fusing.

E. A product which is infusible such that a splinter of the material introduced into the flame of a Bunsen burner, for example, will burn slowly to form a charred mass without any indications of fusing.

Several of these products obtained by the action of alkali, strong or mild, for short or protracted periods, have been described in my prior pending applications and need not be detailed here.

The product A considerably resembles glycerine in its miscibility with water and alcohol and in its color and consistency.

The products B and C are generally speaking of a resinous character.

The products D and E are more akin to horn, bone, ivory, tortoise shell and the like, that is they range from transparent or translucent bodies to those which are opaque, they are hard, dense and strong and insoluble and infusible.

These synthetic products D and E which resemble ivory, tortoise shell, bone, horn and the like form the special feature of the present invention.

To make a product which will resist the action of water, both cold and hot, is a special object of the present invention.

The amorphous material may be obtained in a substantially infusible condition and yet spot or stain on contact with water. On boiling with water the material may turn white thus unfitting it for use in the production of buttons and similar articles which are frequently subjected to the action of water.

I shall now describe how the amorphous material may be made resistant to water and in giving this description it is understood that the illustration represents one detailed manner of procedure which is capable of various modifications. The illustrative description is given in great detail in order that the disclosure may contain every essential fact and complete working information. This is of importance in dealing with complicated organic bodies capable of reacting to totally different compounds through slight variation in working conditions.

Example: 20 pounds of acetone, 50 pounds of aqueous formaldehyde, 37% strength, and 5 pounds of sodium carbonate were mixed and heated with stirring in a closed vessel equipped with a reflux condenser. The operation was carried out at atmospheric pressure although it is possible to work under pressure above that of the atmosphere. It will be noted that in this example the molecular ratio of formaldehyde to acetone is about 2:1, the ratio given being believed to be new in the art, and it produces very satisfactory results. As the reaction progressed the temperature rose well above the boiling point of acetone and after being held at about 80° C. for an hour or so a considerable separation of a heavy-bodied reddish product was observed. The stirring and heating was continued until substantially no more of the viscous material separated from the alkaline water. The reddish product was separated from the aqueous material and was found to be soft and readily flowable while warm, thickening somewhat when cold but still very soft and yielding to the touch. 29 pounds of this product was obtained and the sample on drying at about 100° C. showed a loss of 25 per cent in water and other volatile matter. An ash determination showed 1½ per cent mineral matter. The crude material was soluble in alcohol and in a mixture of alcohol and benzol.

To free this crude product from water soluble impurities and extraneous matter the material was boiled in water with live steam with several changes of water and then dried at a gentle heat. When dry it was no longer soft but in the form of light yellow lumps which were porous and could be crushed rather easily between the fingers. It was more soluble in alcohol than the undried material.

The next step was the introduction of a caustic alkali catalyzer to produce on further heating a water resistant infusible material. To this end the lumps obtained as above were dissolved in methyl alcohol (wood alcohol). A low boiling solvent is desirable in order that the temperature during the drying may be kept low. This prevents undue action of the catalyzer which otherwise might convert the product undergoing drying into an infusible state which could not be readily molded. The solvent employed also should be a solvent for caustic soda or caustic potash. Acetone is not satisfactory for the purpose because it does not dissolve these caustic alkalies. The use of a solvent in this manner is for the purpose of distributing the catalyzer uniformly through the amorphous material. Other methods may be used to accomplish the same end, the present procedure being an illustrative one. Without such uniform distribution of the catalyzer the material would harden imperfectly during molding.

In the present instance a 36 per cent solution of the resin in methyl alcohol was used and concentrated alcoholic potash was added to incorporate about 1 per cent of caustic potash based on the weight of the amorphous substance. The solution was then evaporated in a vacuum pan at 27 inches yielding a layer of the dried amorphous material which then possessed a reddish color.

The material at this stage has the catalyzer uniformly distributed through it and is in condition to be converted into an insoluble infusible mass resembling horn, bone, tortoise shell, ivory and kindred materials. It is very sensitive to heat in the presence of sodium or potassium hydroxide so that a few minutes' exposure in a hot press to a temperature of say 300° to 330° F. (149° to 166° C.) suffices to yield an infusible molded article.

Quick molding is a very important desideratum. Fixed caustic alkali such as the hydroxides of sodium and potassium constitute the only type of highly reactive catalyzer which may be used in small amounts and yet be effective. It is of course undesirable to have any large percentage of an alkaline water-soluble substance present. Carbonates, bicarbonates, borates, phosphates etc., of sodium and potassium are not useful in the final hardening operation. They may be used in the initial reaction between the ketone and the aldehyde but they are greatly lacking in activity in comparison with the fixed caustic alkalies and hence do not afford a product meeting the commercial demands of quick molding. Ammonia and its carbonate are not of consequence as catalytic substances. In making this statement I do not wish to be limited to the exclusion of any of these compounds but wish to call attention to their comparative sluggishness or complete inertness in contrast with the fixed caustic alkalies which have a specific catalytic action.

In fact the activity of fixed caustic alkali in the present composition is so much greater than other alkaline bodies as to give the former a specific and almost exclusive applicability in hot press under the commercial requirements of quick molding. While as stated milder alkalies may be used to produce the initial material, alkalies of the character of caustic potash and caustic soda and to a considerably lesser degree barium hydrate are the available ones for the final catalysis to an infusible water resistant product.

As stated one requirement in reference to the catalyzer is that it should be uniformly distributed. The second is that the quantity should not be so great as to cause poor flowing in the mold due to premature setting and also to get a molded article containing free alkali in objectionable amount. Only enough catalyzer need be present to permit the material to flow in the mold to take the sharp edges and corners of the mold and then to quickly set to a mass sufficiently infusible or hard at the molding temperature that the article may be taken from the mold in the rather rough manner frequently customary in commercial molding operations, (i. e., without special care in handling).

On the other hand enough catalyzer should be present to render the amorphous material water resistant on hot pressing for a short time only. 1 or 2 per cent of caustic potash or caustic soda uniformly distributed through the amorphous material is sufficient, provided no extending materials are present or bodies such as organic acids, phenols etc. absorbing alkali or changing caustic alkali to carbonated alkali or other milder forms of alkali. Extending materials such as wood flour, having a neutralizing effect on the catalyzer, should not be used without proper correction as by prior preparation of the extending material.

While I have above referred to the use of caustic alkalies in the second or final stage, as the preferred catalyst, it is to be understood that in the first stage, the mild alkalies, as described herein (including the carbonates, etc.), are preferably used as the catalyst in the first stage of the process.

In the present invention it is one object to produce a substance so hard and strong that no extending material such as asbestos, wood flour and the like need be used to gain additional strength. It is desired to produce a substance so hard and strong that its own texture without the addition of any other bodies is sufficient to yield many useful articles. Articles made from the material without the addition of other substances constitute the preferred feature of the invention.

The following will indicate results obtained on molding the vacuum dried amorphous material which had been charged with 1 per cent of caustic potash.

A suitable quantity was placed in a mold and pressed first at 600 pounds and then at 1000 pounds pressure and at a temperature of 330° F. (166° C.), the total period of pressing being 3 minutes. The product was almost infusible, was of an amber color and was rather brittle. When boiled in water the surface turned a yellowish white.

Another portion of the amorphous material was pressed 5 minutes under the same conditions of temperature and pressure yielding an amber colored molded article which was infusible. On boiling with water the surface was whitened only very slightly, in fact to such a small extent as to not be objectionable for many purposes.

Similar moldings were made for 10 minutes and 20 minutes respectively. These products were of a cloudy amber appearance and were entirely unaffected on protracted boiling in water.

The hardness and strength increased with the duration of exposure in the hot press. The samples were tested with minerals ranging according to the scale of hardness, the 3 minute sample being readily scratched by selenite which is No. 2 in the scale of hardness. The 5 minute sample which was much less brittle than the previous one was not scratched by selenite but was scratched by calcite which is No. 3 in the scale. The 10 minute cure was hard and strong and barely scratched by calcite. The 20 minute cure was noticeably hard and strong and very little impression could be made on its surface by either calcite or fluorite, the latter being No. 4. It was however scratched by apatite which is No. 5 on the scale.

Buttons were molded using a 10 minute cure as aforesaid and these articles when boiled in soapy water did not turn white or lose their surface finish.

Articles molded with a mold having a smooth surface acquire a very attractive finish and by adding suitable dyes or colors to the amorphous material or by mixing different colors attractive tints are obtained or mottled and marbled effects.

The products obtained hereunder are stained by strong acids such as concentrated hydrochloric acid which quite rapidly discolors the material cured 3 minutes but has less staining action on the 20 minute cure. Concentrated nitric and sulphuric acid blacken the surface.

Strong caustic soda however does not have any corrosive action on the converted amorphous material. In fact when a piece of the amorphous material which had been given the 3 minute cure as above and which was whitened on boiling with water was boiled in a 20 per cent aqueous caustic soda solution whitening did not occur. It is probable that this hot strong solution of caustic soda exerted an additional superficial cure (besides that produced in the hot molding step), which prevented any whitening action by the water present. A button which had been molded from the amorphous material and which had been given a 10 minute cure was quite unaffected by boiling caustic soda. Hence while the material is discolored or attacked by strong acids it is not injured but may even be improved in quality by contact with caustic alkali solutions. The material therefore may be used to advantage in coating, impregnating or otherwise treating materials to render them resistant to caustic alkali or for making containers for alkaline substances.

For example paper either sized or unsized or pasteboard, press board, beaver board or paper which has been treated with zinc chloride as in making hard fiber may be impregnated with a solution of the amorphous material which thus serves as a sizing or filler for the paper. By thoroughly filling the pores of the paper and liberally coating the surface the sheets may then be hot pressed together to build up press board of any desired thickness. Such material may be used for various purposes as for example as insulation. In a similar manner canvas or other textile material may be filled with the amorphous material and sheets pressed together to build up a thick structure from which various products may be machined out as for example gears. Or vessels adapted for holding solutions may be pressed from such filled or impregnated sheets.

Of course in producing such press board it is understood that the amorphous material carries a sufficient quantity of catalyzer to readily harden and cement the sheets together. In order to render the textile material etc. substantially free from action on the catalyzer during the thermo-setting operation such textile material may be previously thoroughly washed or boiled with dilute caustic alkali solutions.

While the preferred embodiment is a thermo-rigid amorphous or colloidal solid which is hard, strong and water resistant another modification involves the addition of various extending materials or bodies intended to modify the color, texture, surface, finish etc. Also substances may be added which render the amorphous material slower burning or quite incombustible. The amorphous material it may be stated is not inflammable like nitrocellulose but may be ignited when held in a strong flame and then may burn for a short time and die out. Or if a very thin film of the amorphous material is ignited it may burn completely. The addition of fire-proofing materials therefore may be made if desired. The amorphous material also may be incorporated with resins as for example the various natural resins or artificial or synthetic resins such as those made from phenol and formaldehyde, cumaron resin, aldol resin, acetylene and phenol resin, urea and formaldehyde. Fluxes such as camphor, tricresyl phosphate, aniline and the like may be introduced. Extending bodies such as fibrous asbestos, asbestos powder, linters, flock, wood flour and the like may be added. It may be stated however that wood flour has a very peculiar action on the catalyzer, absorbing or neutralizing it so that wood flour mixtures with the amorphous material even though hot pressed for an extended period quite readily spot when moistened with water. Mineral powders of various descriptions may be used especially those which are not of an acid character and do not absorb the catalyzer before it exerts its action on the amorphous material to bring about infusibility. An extending material not absorbing alkali until after the latter has exerted its catalytic action is desirable.

When the extending material is mixed with an alcoholic solution of the amorphous binder containing caustic alkali catalyzer there is great danger that the catalyzer may be neutralized in some manner or by exposure to the air will become carbonated and practically inert for molding purposes.

To avoid reaction with the extending material the amorphous body with its catalyzer may be incorporated with the extending material on hot rolls or by grinding in ball mills. Casein, starch and the like may be introduced in some cases. For example an aqueous solution of casein in caustic soda may be incorporated with the amorphous material at an earlier stage in its preparation and the alkali will then serve as a catalytic agent. Thus the combined effect of "galalith" (casein formaldehyde compound) and the amorphous material may be obtained.

Mold lubricants such as paraffin or ceresin wax, carnauba wax and the like may be employed. Stearic acid which is frequently used is not so desirable in the present case on account of reacting with the caustic alkali catalyst and impairing the activity of the latter for some purposes.

Making a water-resistant, infusible product is therefore a function of the catalytic activity, the time of heating or hot pressing the temperature employed, and when extending material is used it very much depends on its character and destructive effect on the catalyzer.

By using a high percentage of caustic soda a product may be obtained which will set in the cold or on gently warming but such cold molded products do not have great strength and for insulating purposes would not possess the proper dielectric strength in many cases. Impregnation of the filling material with a caustic alkali solution and subsequent drying may be used in special applications.

As previously noted too much catalyzer will cause setting when the material is first put in contact with a hot mold and the proportion of catalyzer should be adjusted with reference to the particular molding conditions in hand.

In practical operation a relationship may be soon established between the percentage of catalyzer and the molding periods demanded. High temperature and longer time of pressing will not necessitate so great a content of catalytic material. On the other hand high catalyzer content coupled with low temperature and shorter time of molding will give good results.

The labor cost and expense of maintenance of molds makes an imperative commercial demand for rapid molding.

To meet this requirement the highest percentage of catalyzer and highest co-ordinating temperature should be employed consistent with the production of a hardened material having an initially flowable character in the mold.

In preparing the amorphous body I have particularly mentioned acetone and methyl ethyl ketone and I have in mind employing ketones of this general character which are of a reactive nature. In addition to these aliphatic ketones I may also employ those of a cyclic character as for example I have found cyclohexanone to react with formaldehyde in the presence of alkali to form a suitable amorphous body having a desirable resistance to moisture. In place of aqueous formaldehyde paraform may be used but hexamethylenetetramine is not well suited for the purpose. The same is true of aldehyde ammonia prepared from acetaldehyde and there are various ketones and aldehydes which are not capable of reaction to water resistant amorphous products but which may form water soluble bodies or those of a crystalline character which are not adapted for making molded products of the character herein described and I do not lay claim to such compounds broadly but only to amorphous substances produced by treating a reactive ketone with a reactive aldehyde or its equivalent to yield an amorphous material capable of hardening on heating to a water-resistant hard, dense, impermeable, substantially infusible or heat resistance product.

What I claim is:—

1. The process which comprises reacting on acetone and formaldehyde in the presence of an alkaline condensing agent to produce soluble amorphous material, washing and drying the material and dissolving in a solvent, adding an alkaline catalyzer, drying and hot pressing for a period sufficient to form a water resistant, infusible, hard strong article.

2. The process which comprises reacting on a reactive ketone with an aldehyde of the formaldehyde series, the presence of an alkaline condensing agent to form a primary substance of an amorphous character, introducing strongly alkaline catalytic material and hot pressing for a period sufficient to form a water resistant, infusible, hard, strong article.

3. An infusible, water resistant, hard, strong, amorphous body prepared from acetone and formaldehyde and free from extending material.

4. A process which comprises bringing together a ketone, an aldehyde and a mild alkali capable of causing the same to react when heated, thereby forming a soluble amorphous body, separating the water from the latter, adding a small percentage of a solid caustic alkaline material and thoroughly incorporating the matter, and thereafter molding under pressure in the absence of fillers capable of combining with such caustic alkaline material.

5. An infusible, water-resistant, alkali resistant molded body, of relatively high strength, formed of a reaction product of an aldehyde of the formaldehyde series and acetone, in a molecular ratio of about 2:1, such body being substantially free from extending material and not readily combustible.

CARLETON ELLIS.